United States Patent

[11] 3,554,293

| [72] | Inventors | Edward F. Aman, Greenville, Fla., and Ivan W. Rowell, 1101 N. Washington St., Perry, Fla. 32347 |
|---|---|---|
| [21] | Appl. No. | 795,431 |
| [22] | Filed | Jan. 31, 1969 |
| [45] | Patented | Jan. 12, 1971 |
| [73] | Assignee | Said Aman assignor to said Rowell |

[54] ROTARY WEEDING AND EDGING ATTACHMENT FOR ROTARY POWER SOURCE
2 Claims, 5 Drawing Figs.

[52] U.S. Cl............................................ 172/13, 172/25
[51] Int. Cl........................................... A01b 45/00
[50] Field of Search.................................... 172/13, 41, 15, 111, 351, 371, 25; 30/(Inquired)

[56] References Cited
UNITED STATES PATENTS

| 2,574,237 | 11/1951 | Barrow................ | 172/111X |
| 2,706,441 | 4/1955 | Caldwell et al............ | 172/111 |
| 2,991,838 | 7/1961 | Lane........................ | 172/111X |
| 3,143,176 | 8/1964 | Drane, Jr................... | 172/13X |
| 3,444,934 | 5/1969 | Alberto.................... | 172/41X |

FOREIGN PATENTS

| 1,052,462 | 1/1954 | France..................... | 172/41 |
| 832,931 | 4/1960 | Great Britain............. | 172/41 |

*Primary Examiner*—Robert E. Pulfrey
*Assistant Examiner*—James W. Peterson
*Attorneys*—Clarence A. O'Brien and Harvey B. Jacobson ABSTRACT: A readily portable implement which lends itself to attachment to a manually controllable motorized drill. An upper end of a vertically elongate shaft is secured in the usual drill chuck. The lower end is equipped with blade means, one for weeding and the other one for edging. The bladed lower end is operably confined within the limits of a cuplike shell or guard. The depending rim of the guard is provided with ground penetrating and holddown cleats.

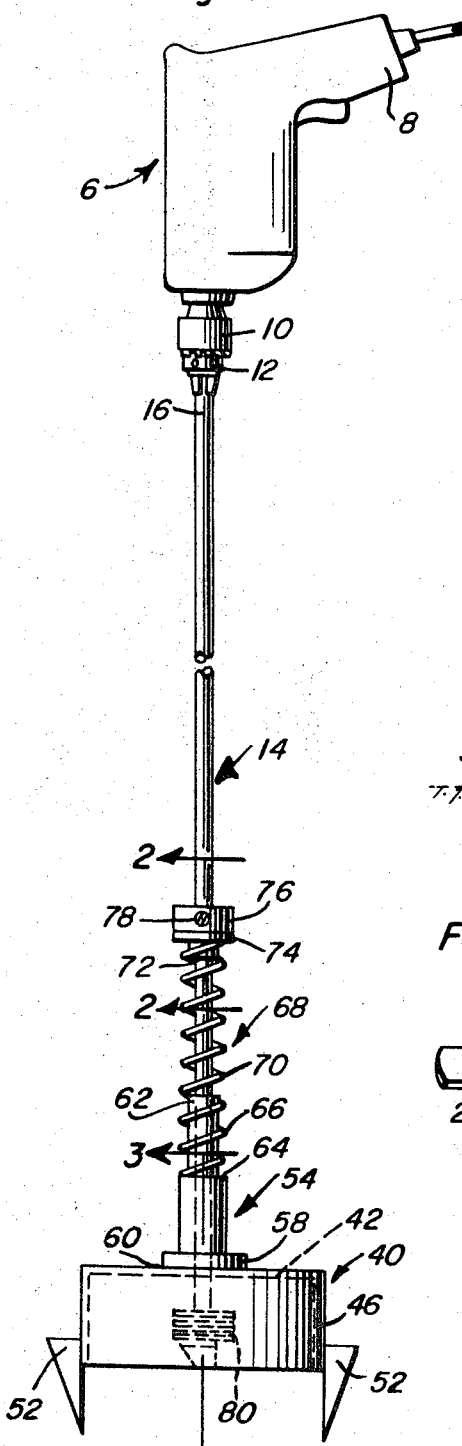
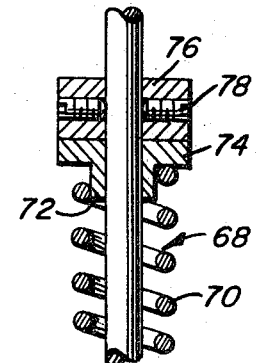
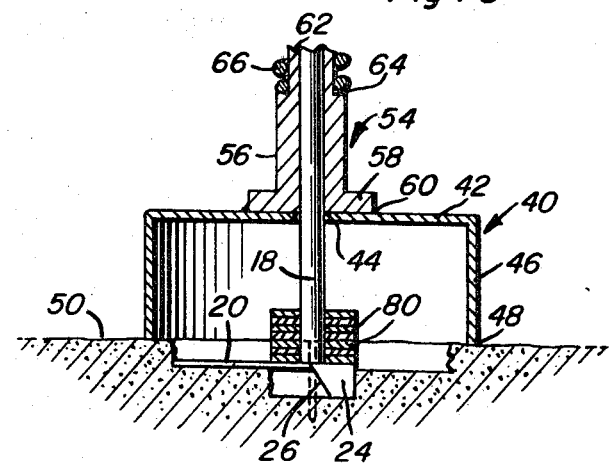
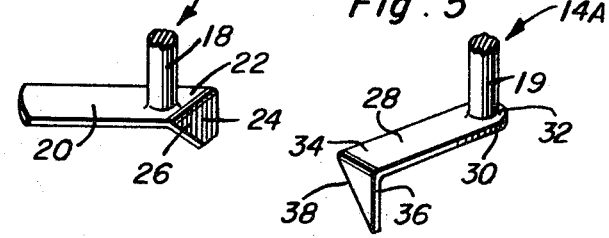
Fig. 1
Fig. 2
Fig. 3
Fig. 4
Fig. 5
Edward F. Aman
Ivan W. Rowell
INVENTORS.
BY Clarence A. O'Brien
and Harvey B. Jacobson
Attorneys

3,554,293

ROTARY WEEDING AND EDGING ATTACHMENT FOR ROTARY POWER SOURCE

This invention relates to a self-contained multipurpose lawn and garden implement which is characterized by a vertically elongated solid steel or an equivalent shafts whose upper end are readily attachable to and detachable from a stock chuck carried by an easy-to-handle drill motor, each shaft having selectively usable blade means and guard means at its lower earth-working end.

Briefly, the overall concept, generally stated, features an inverted circular cup-shaped shell. This shell provides a hood or guard and embodies a centrally apertured disc or plate which has a marginal depending endless skirt or rim whose bottom edge is adapted to seat firmly atop the precise surface of the earth which is to be acted upon and worked. A flanged hub is welded or otherwise fixed atop the centrally apertured portion of the plate and the upstanding sleeve portion provides a shaft bearing. A vertically elongated solid shaft has a lower end portion which is rotatable and slidable in the bearing. The lower end of the shaft is provided with captive blade means housed for protective rotation within the hollow confines of the shell or guard. Coil spring means surrounds the lower portion of the shaft and is interposed between the hub and shoulder means which is adjustably mounted on the shaft at the height desired for best results.

In carrying out the overall concept two like but interchangeable spring-loaded shafts are provided each shaft having an integral right-angled blade at the lower end of the companion shaft. One blade is shaped and constructed to function as a rotary weeder and the other blade as a rotary edger. The return spring means functions to position and hold the cuplike guard housing in place and assists in staking the depending anchoring cleats in the ground, whereby the guard housing stays put while the rotating blade makes the desired cut. As is evident, the thus retained guard housing constitutes a safety feature and also traps and collects the weed and grass laden earth. A plurality of washers surround that portion of the shaft which turns in the shell or housing and are normally stacked one atop the other. These free washers, as experience has shown, keep the coordinating portion of the shaft clean and, in fact, prevent clogging of the shaft with winding weeds and grass.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation of a rotary weeding and edging attachment for a conventional-type drill motor.

FIG. 2 is an enlarged fragmentary detail view taken on the plane of the vertical section line 2—2 of FIG. 1.

FIG. 3 is an appropriately enlarged detail view with parts in section and elevation taken approximately on the plane of the vertical section line 3—3 of FIG. 1.

FIG. 4 is a perspective view showing the lower end of one shaft, that is the shaft which is provided with an integral weeder blade means.

And FIG. 5 is a view also in perspective showing the interchangeable or alternate selectively usable shaft with its specially constructed edger blade.

Referring now to FIG. 1 in particular it will be seen that the portable manually positionable and controllable drill motor is denoted by the numeral 6, the same having the customary handgrip 8 and driven shaft means 10 carrying an appropriate chuck 12.

The overall attachment is characterized, as already suggested, by a rigid solid steel or equivalent shaft 14 of requisite length and cross section. The upper end portion 16 of the shaft is designed and adapted to be fitted and retained in the chuck 12 as illustrated in FIG. 1. The lower end portion of the shaft is denoted at 18 (FIG. 3). The extreme lower end is provided with an integral right-angularly disposed earth working and cutting blade which is here denoted at 20 and has flat top and bottom faces and is substantially rectangular in plan and is provided with appropriate longitudinal cutting edges. The heel portion 22 of this blade is provided with a depending lug or tooth 24 which has a beveled cutting edge 26. This particular blade lends itself to feasible and practical use as a weeder blade. The interchangeable or alternatively usable shaft is conveniently denoted here by the reference 14A. In this adaptation and arrangement the lower end portion 19 is provided with an integral right-angularly disposed blade 28 whose heel portion 30 is welded or otherwise rigidly connected at 32 to the extreme lower end of the shaft 14. Here the free end portion 34 is provided with a depending lug or tooth 36 having an inclined edge 38 thus providing a substantially triangulate tooth. This blade lends itself to use for edging purposes.

With respect now to the guard housing this comprises an inverted cuplike shell and it is designated, as an entity, by the numeral 40. It is of requisite depth and plan dimension. It is shown as circular in plan and comprises a disclike top plate 42 which has a centralized opening or aperture 44 therein. The depending annular skirt or rim is denoted by the numeral 46 and the lower lip edge 48 is adapted when in use to rest atop the earth or other surface 50 which is being acted on. For security and adequate functioning diametric opposite lower portions of the rim are provided with integral depending triangulate holding or anchoring cleats 52. The numeral 54 designates a solid hub which, more specifically, comprises a sleeve 56 whose lower end portion 58 is provided with an outstanding flange welded or otherwise fixedly secured atop the plate so that the bore of the sleeve is aligned with the opening 44. The sleeve has an upper reduced portion 62 defining a shoulder 64 atop which the lower most convolution or coil of a coil spring rests as brought out in FIGS. 1 and 2. The lower convolutions are conveniently designated in FIG. 2 by the numeral 66. The overall coil spring is denoted at 68 and the upper convolutions or coils 70 surround the neck portion 72 of a bushing, that is a bushing which includes a flange 74 resting against the underneath side of a limit stop collar 76. This collar is adjustable on the shaft and is provided with setscrews 78 whereby it is securely maintained in place when being used in the manner shown best in FIG. 1. The coil spring returns or lifts the bladed end of the shaft to assume the retracted position shown in phantom lines in FIG. 2, this being the normal starting position. The aforementioned washers (seven shown) are denoted at 80 and are stacked atop each other and encircle the portion of the shaft shown in phantom lines in FIG. 1 and in full lines in FIG. 3. It is reiterated that the washers keep the shaft clean and help prevent the weeder from getting clogged with weeds and grass and refusing to operate properly.

It is understood that the shafts 14 and 14A are interchangeable and the user selects whichever shaft is desired depending on the job which is to be performed. The weeder blade is shown in use in FIGS. 1 and 2. By removing the shaft 14 and its blade the shaft 14A can be substituted so that its blade 28 comes into play (not detailed); that is, when an edging job is to be undertaken. It follows that the illustration of the shaft 14 in use serves to comprehend the dual purpose of the overall implement.

Briefly and in using the invention all that is necessary is to attach the upper end 16 of the shaft 14 to the chuck. Then when the motor is switched on the shaft turns in the bearing sleeves 62 and 56, that is, the hub means 54 shown in FIG. 3. It takes about 10 pounds pressure more or less to press the bladed end of the shaft to assume the operating position shown in FIG. 2. As there shown, it is evident that the edge 48 rests firmly atop the surface 50 and is temporarily held by the staking and retaining cleats 52. The blade means then comes into play to work the soil depending on the desired depth of the cut. The same procedural steps are followed when substituting the shaft 14A and edger blade 28 for the weeder blade 20.

Experience has shown that the implement herein described is aptly and satisfactorily used to effectually cut out unwanted plants and grass in gardens and lawns. It can also be used effectively to work the soil around the plants and shrubs. The tension on the spring means 68 can be regulated by adjusting the collar 76 and bushing 72 up or down on the shaft in a seemingly self-evident manner. Other features and advantages are evident, it is submitted, from the views of the drawing and the description thereof. Accordingly a more extended description is deemed to be unnecessary.

The foregoing is considered as illustrative only of the principles of the invention. Further, since numerous modifications and changes will readily occur to those skilled in the act, it is not desired to limit the invention to the exact construction and operation shown and described, and accordingly all suitable modifications and equivalents may be resorted to.

We claim:

1. In combination, a portable manually controllable drill motor having an axial tool accommodating and attaching chuck, an inverted cuplike shell constituting a hoodlike guard housing embodying an axially apertured horizontal plate having a depending annular rim adapted to be seated atop the surface of the earth which is to be worked, said rim having depending ground penetrating and anchoring cleats, a hub fixed atop said plate and embodying an upstanding sleeve, said sleeve providing a shaft bearing and being aligned with the aperture in said plate, a vertically elongated shaft having upper and lower ends and an intervening median portion slidingly and rotatably mounted in said aperture and bearing, respectively, the upper end of said shaft being removably but operatively connected with said chuck, the lower end of said shaft depending into said shell and having a blade, said blade being confined and rotatable within the confining limits of said shell, said blade being horizontally elongated, flat-faced, disposed at right angles to the vertical axis of said shaft and having an outer free end provided with a depending triangulate cutting and edging tooth, an expansion-type coil spring encircling a lower portion of said shaft and having a lower end resting on and having end thrust engagement with a portion of said sleeve, collar means adjustably mounted on said shaft and providing a shoulder, said spring having an upper end and said upper end having end thrust engagement with said collar means, said collar means comprising a stop collar provided with setscrews engaging coacting surface portions of said shaft, and a bushing surrounding the shaft and provided with an encircling flange abutting said collar and a plurality of washers surrounding that part of the lower end portion of said shaft which is located within said shell, said washers being independent and free to slide and turn on said shaft.

2. For use in conjunction with a portable manually usable drill having a power driven rotatable chuck, an earth cutting, weeding and edging implement comprising, in combination, an inverted cuplike ground engaging shell constituting a loose earth trapping and collecting member and embodying a horizontal centrally apertured disclike plate having a marginal depending annular rim having a lower edge which is adapted to be placed firmly atop the surface which is to be acted upon, a hub embodying an upstanding sleeve, said sleeve having a flange fixed atop said plate, said sleeve providing a shaft bearing and being aligned with the aperture in said plate, a vertically elongated shaft having upper and lower ends and an intervening median portion slidingly and rotatably mounted in said aperture and shaft bearing, respectively, the upper end of said shaft being adapted to be removably but operatively connected with said chuck, the lower end of said shaft depending into said shell and having a blade, said blade being confined and rotatable within the confining limits of said shell, an expansion-type coil spring encircling a lower portion of said shaft and having a lower end resting on and having end thrust engagement with a coacting shouldered upper portion of said sleeve, and collar means adjustably mounted on said shaft and providing a shoulder, said spring having an upper end, and said upper end having end thrust engagement with said collar means and a plurality of individual washers surrounding that part of the lower end portion of said shaft which is located within the encompassing confines of said shell, said washers being stacked one atop the other and being independent and free to slide and turn on said shaft between the blade and underneath side of said plate.